US008509202B2

(12) United States Patent
Wang et al.

(10) Patent No.: US 8,509,202 B2
(45) Date of Patent: Aug. 13, 2013

(54) METHOD FOR COMMUNICATING IN A NETWORK, A SYSTEM AND A PRIMARY STATION THEREFOR

(75) Inventors: Xiangyu Wang, Eindhoven (NL); Johan Paul Marie Gerard Linnartz, Eindhoven (NL); Patrick Van Kooten, Hurstville Grove (AU)

(73) Assignee: Koninklijke Philips N.V., Eindhoven (NL)

( * ) Notice: Subject to any disclaimer, the term of this patent is extended or adjusted under 35 U.S.C. 154(b) by 224 days.

(21) Appl. No.: 13/058,722

(22) PCT Filed: Aug. 7, 2009

(86) PCT No.: PCT/IB2009/053457
§ 371 (c)(1),
(2), (4) Date: Feb. 11, 2011

(87) PCT Pub. No.: WO2010/018505
PCT Pub. Date: Feb. 18, 2010

(65) Prior Publication Data
US 2011/0149939 A1 Jun. 23, 2011

(30) Foreign Application Priority Data
Aug. 14, 2008 (EP) .................................... 08300256

(51) Int. Cl.
*H04W 4/00* (2009.01)
(52) U.S. Cl.
USPC ......................................................... 370/338
(58) Field of Classification Search
USPC ......................................................... 370/338
See application file for complete search history.

(56) References Cited

U.S. PATENT DOCUMENTS

| 2002/0136182 | A1 | 9/2002 | Bardehle |
| 2002/0136183 | A1* | 9/2002 | Chen et al. .................... 370/338 |
| 2004/0240402 | A1* | 12/2004 | Stephens ....................... 370/310 |
| 2005/0192048 | A1* | 9/2005 | Bridgelall .................. 455/553.1 |
| 2006/0239223 | A1* | 10/2006 | Sherman et al. .............. 370/329 |
| 2007/0110001 | A1 | 5/2007 | Ting et al. |
| 2008/0130603 | A1* | 6/2008 | Wentink et al. ............... 370/338 |

FOREIGN PATENT DOCUMENTS

| EP | 1999842 A2 | 4/2002 |
| EP | 1207654 A2 | 5/2002 |
| JP | 2006050526 A | 2/2006 |

(Continued)

OTHER PUBLICATIONS

Jung et al: "Ubiquitous Wearable Computer (UWC)—Aided Coexistence Algorithm in an Overlaid Network Environment of WLAN and Zigbee Networks"; 2nd International Symposium on Wireless Pervasive Computing, IEEE 2007, pp. 212-217.

(Continued)

*Primary Examiner* — Clemence Han

(57) ABSTRACT

The present invention relates to a system comprising at least one primary station and at least one secondary station, wherein the primary station comprises communication means for communicating with the secondary station in accordance with a first protocol, wherein the communication means are arranged for communicating with a plurality of further stations in accordance with a further protocol, and wherein the primary station comprises control means for generating a message to be broadcast to the secondary station, said message comprising purposely erroneous information causing the at least one secondary station to remain silent for a predetermined duration.

10 Claims, 4 Drawing Sheets

(56) References Cited

FOREIGN PATENT DOCUMENTS

| | | |
|---|---|---|
| JP | 2007015197 A | 1/2007 |
| JP | 2007135173 A | 5/2007 |
| WO | 03105418 A2 | 12/2003 |
| WO | 2007137001 A2 | 11/2007 |
| WO | 2008067505 A2 | 6/2008 |

OTHER PUBLICATIONS

Mulder, R.: The Case for Medical Grade Wireless Connectivity; Philips Medical Systems; The Institution of Engineering and Technology, 3rd International Conference on Medical Electrical Devices and Technology, Oct. 2-3, 2007, 9 Page Document.

* cited by examiner

METHOD FOR COMMUNICATING IN A NETWORK, A SYSTEM AND A PRIMARY STATION THEREFOR

FIELD OF THE INVENTION

The present invention relates to a method for communicating in a network, said network coexisting with a further network. The present invention also relates to a primary station and a system comprising such a primary station.

This invention is, for example, relevant for coexistence of two networks, as two wireless networks sharing at least partly the same bandwidth or at least interfering one with another. In an example a first network is a Wifi or WLAN network, and a second network is a Zigbee or IEEE 802.15.4 network.

BACKGROUND OF THE INVENTION

In a communication network, interference can be caused by neighbouring communication, like wired communication sharing the same medium or wireless communications sharing the same resource like a frequency band. As an example, Zigbee devices are low cost/low power wireless devices that may operate at a frequency band of 2.4 GHz with a transmission power of 1 mW (0 dBm). This frequency band is used by other technologies like Bluetooth, WiFi or IEEE 802.11 wireless Local Area Network (WLAN). Some other interference may occur from other devices in this band like microwave ovens. It is understood that WLAN devices pose the most serious issue for the operation of Zigbee devices for the transmission power of WLAN devices is substantially higher than the transmission power of Zigbee devices, typically 100 mW or 20 dBm. Moreover, WLAN devices, used everywhere, operates on a bandwidth broader than the one of Zigbee devices.

As a consequence, it has been observed that a Zigbee network operates poorly with a WLAN network coexistence. The coexistence performance depends on the distance between WLAN interference and Zigbee devices. Since several applications of Zigbee (lighting of building, medical or patient monitoring) need a reliable communication within an environment which will likely contains at least one WLAN network, it is a need to propose a solution to reduce the amount of interference to enable the Zigbee network to operate.

SUMMARY OF THE INVENTION

It is an object of the invention to alleviate these drawbacks.

It is another object of the invention to propose a method which permits to ensure a reliable communication even if there is coexistence of several networks.

Still another object of the invention is to propose a device enabling a robust way of reducing the interference being transparent for the coexistent networks.

To this end, in accordance with the invention a communication system is proposed, said system comprising at least one primary station and at least one secondary station, wherein the primary station comprises communication means for communicating with the secondary station in accordance with a first protocol, wherein the communication means are arranged for communicating with a plurality of further stations in accordance with a further protocol, and wherein the primary station comprises control means for generating a message to be broadcast to the secondary station, said message comprising purposely erroneous information causing the at least one secondary station to remain silent for a predetermined duration.

In accordance with another aspect of the invention, it is proposed a method for communicating in a network comprising at least one primary station and at least one secondary station, wherein the primary station communicates with the secondary station in accordance with a first protocol, wherein the primary station communicates with a plurality of further stations in accordance with a further protocol, and said method comprising generating a message to be broadcast to the secondary station, said message comprising purposely erroneous information causing the at least one secondary station to remain silent for a predetermined duration.

In accordance with still another aspect of the invention, a primary station is proposed for communicating within a network comprising at least one secondary station, wherein the primary station comprises communication means for communicating with the secondary station in accordance with a first protocol, wherein the communication means are arranged for communicating with a plurality of further stations in accordance with a further protocol, and wherein the primary station comprises control means for generating a message to be broadcast to the secondary station, said message comprising purposely erroneous information causing the at least one secondary station to remain silent for a predetermined duration.

As a consequence, the interference may be reduced or even nullified when data needs to be transmitted by the devices using the second protocol. This enables also not to amend any of the technical specifications of the coexisting protocols, and this system is transparent for any devices.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a network comprising nodes coexisting with a second network, and sharing at least partly the same resource.

Figure 1:
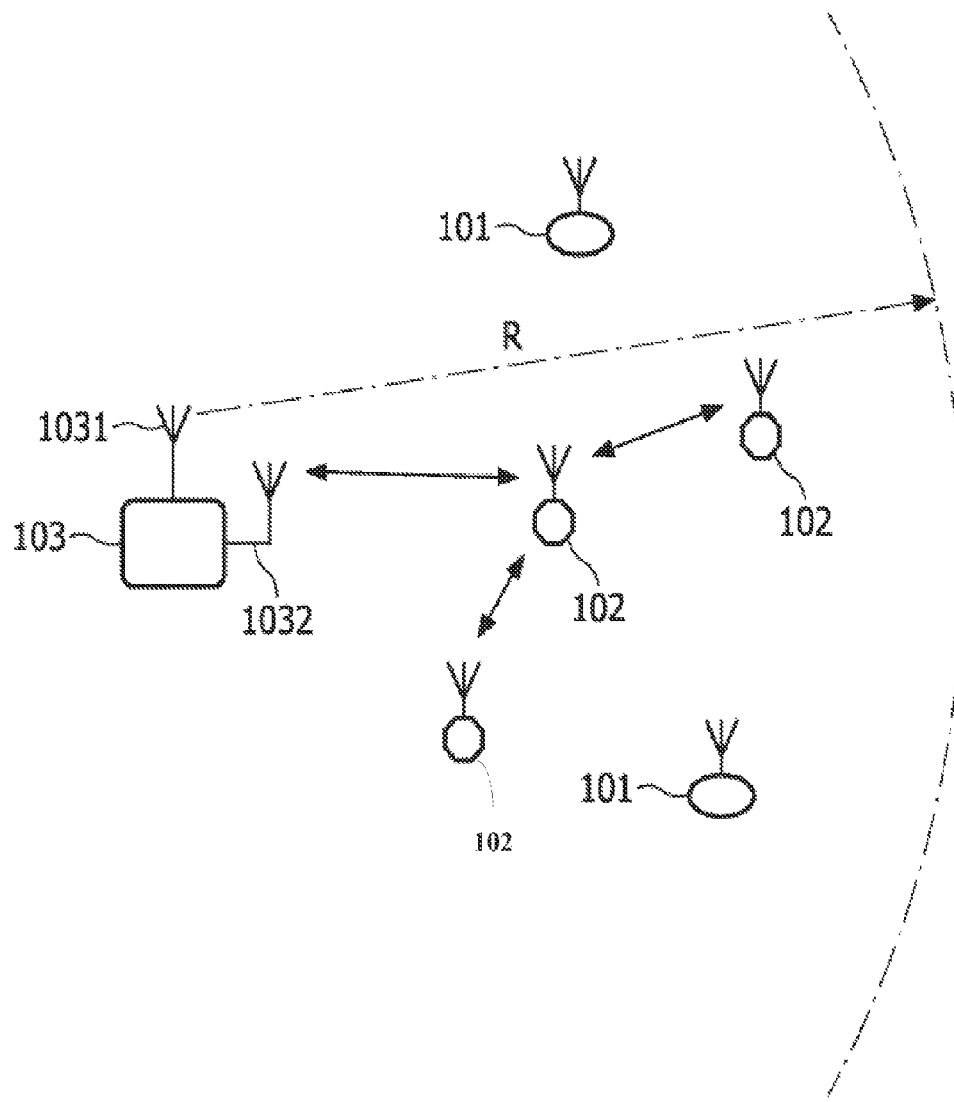
FIG. 1 is a block diagram of a network in accordance with a first embodiment of the invention in an interfering network.

In the first embodiment illustrated on FIG. 1, a first network comprising a plurality of wireless nodes 101 shares the same resource with a second network comprising a plurality of wireless nodes 102. In this example the first network is a Wifi network like a WLAN, and the second network is a ad hoc network, like a Zigbee network. In this case, the shared resource is a frequency band. In other example, the shared resource could be a time slot or a spreading code.

As explained in the preamble of the description, when a Zigbee node 102 wishes to communicate with another node, the interference caused by the surrounding WLAN nodes 101 makes the connection difficult and sometimes impossible.

In accordance with a first embodiment of the invention, a gateway or a primary station 103 is able to communicate both with Zigbee nodes and WLAN nodes, or at least can understand both protocols. For instance, this primary station 103 is a computer having connections to other WLAN nodes 101 and communicating with the Zigbee nodes 102. Another example is for patient monitoring application, ZigBee connects medical monitoring sensors on a patient's body to a bedside monitor. The bedside monitor may use WLAN to relay monitoring data across hospital WLAN network to a remote central server. In lighting control application, to overcome scalability issue, multi-hop ZigBee networks are connected to a multi-hop WLAN infrastructure, where control and sensing data are relayed to a central controller. For both cases, there are sensor network gateway devices that have both ZigBee and WLAN interfaces.

In accordance with a first embodiment of the invention, the primary station 103 is a sensor gateway. In an example of the invention the primary station comprises two different transmitter to communicate in each protocol. A transmitter 1031 is used to communicate with the WLAN nodes 101, and second transmitter 1032 is used to communicate with the Zigbee nodes 102.

In accordance with a first embodiment of the invention, when a Zigbee node 102 wishes to send data to another Zigbee node within the coverage R of the primary station 103, this primary station 103 transmits a message containing purposely an error in order to silent the neighbouring WLAN nodes 101.

This permits to reduce or nullify all WLAN interference for a predetermined period during which the Zigbee nodes are able to communicate with each other.

Figure 2:
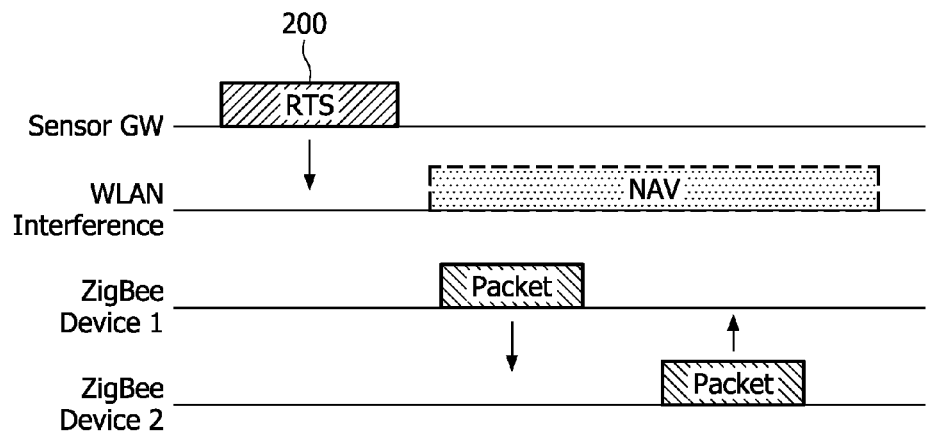
FIG. 2 is a time chart representing the messages sent in accordance with the first embodiment.

In accordance with a first embodiment illustrated on FIG. 2, the primary station 103 transmits a RTS (Ready to Send) message to an address that is currently not present in the network. It means that the WLAN stations 101 in the surroundings believe that a data transmission to another WLAN station has been scheduled, although this address does not correspond to any valid address.

As a result, no WLAN station 101 in the surrounding area R will response with a CTS message. However, the WLAN stations that receive the RTS message will keep silent either until the time specified in the NAV field in the RTS message expires or optionally until a RTS timeout value in the new update of IEEE 802.11 standard.

This first embodiment is based on the idea of making use of the WLAN interfaces of sensor gateways to send out redundant or gratuitous WLAN messages in their original forms or in modified forms, which are able to inhibit WLAN interfering stations from transmitting for specified time duration in the message. According to the IEEE 802.11 standard, RTS and CTS messages are used for eliminating hidden nodes. Within a RTS or CTS message, there is a value called Network Allocation Vector (NAV) that is time value in microseconds. Stations overhear a RTS or a CTS message should update their NAV value according to the value indicated by the RTS or CTS message. Stations are then refrained from any transmission before their NAV value reaches zero. In IEEE 802.11g standard, in order to be backward compatible (i.e. be compatible with IEEE802.11 and IEEE 802.11b devices), an IEEE 802.11g device sends out a CTS message with the address of itself to silent surrounding IEEE 802.11 and IEEE 802.11b device before it sends a DATA packet in IEEE 802.11g format, which cannot be understood by legacy IEEE 802.11 and IEEE 802.11b devices. The CTS messages sent out by an IEEE 802.11g device, however, is in the legacy format that can be understood by legacy devices. The NAV value contained in a CTS message is used to prevent legacy devices from potential transmissions.

As can be seen on FIG. 2, it is further depicted how a gratuitous RTS or CTS message 200 is used to silent WLAN interference nodes 101 from any transmission in accordance with the first embodiment. The overhearing WLAN interference stations will have to update their NAV value according to what is indicated in the RTS message and will not try to access the medium for the NAV time indicated. The ZigBee nodes 102 cannot overhear the sent RTS message. As a result, ZigBee devices will try to access the idle medium cleared by the RTS message, and will transmit their packets accordingly. If the NAV value is made sufficiently large, multiple ZigBee transmissions can be accommodated by just one RTS message. Indeed, the maximum valid NAV value is 32.767 ms. As a comparison, a ZigBee packet with maximum allowed payload occupies 4.256 ms on the air. Hence the idle time created by the RTS message can potentially allow multiple ZigBee packets to be exchanged without any fear for interferences.

Figure 3:
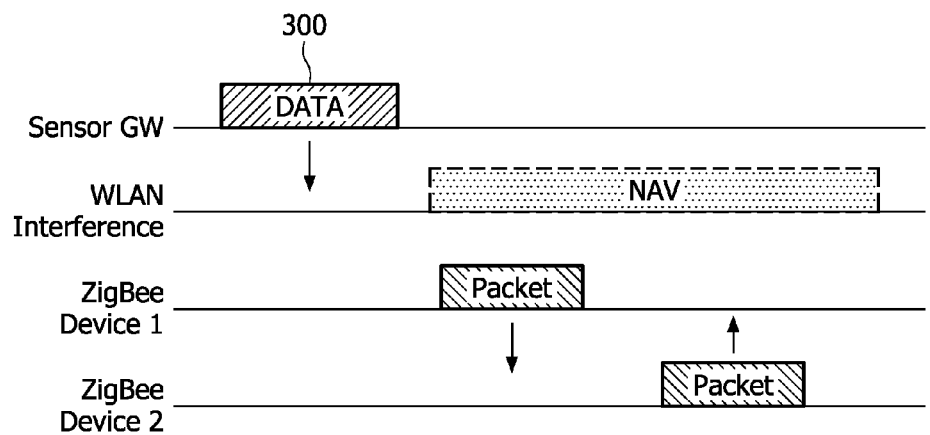
FIG. 3 is a time chart representing the messages sent in accordance with a second embodiment of the invention.

In a second embodiment illustrated on FIG. 3, the primary station 103 transmits a fake Data packet 300. In fact, it is proposed to send a data for instance with a header indicating a data length which is longer than effective. Thus, the surrounding WLAN stations 101 overhearing the header, will not communicate during the length indicated in the header of the data packet.

In this case depicted on FIG. 3, a DATA message that the sensor gateway sends contains a fake length of the DATA message. The transmitted DATA message is short in duration; hence makes room for ZigBee transmissions.

Figure 4:
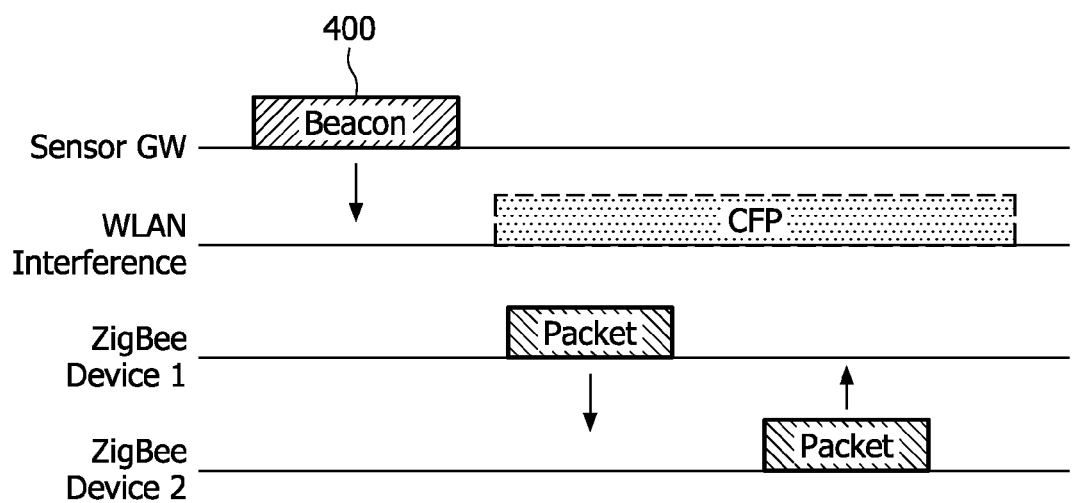
FIG. 4 is time chart representing the messages sent in accordance with a third embodiment of the invention.

In a third embodiment illustrated on FIG. 4, the message sent by the primary station is a beacon 400 indicating the beginning of a contention free period, and wherein the erroneous information comprises the length of the contention free period. In the IEEE 802.11 specification, all WLAN station that overhears the beacon commands will have to be silent for the specified period to allow contention free transmission. In this fourth embodiment, the sensor gateway does not really initiate CFP transmissions; it simply silent the media for ZigBee to communicate.

Figure 5:
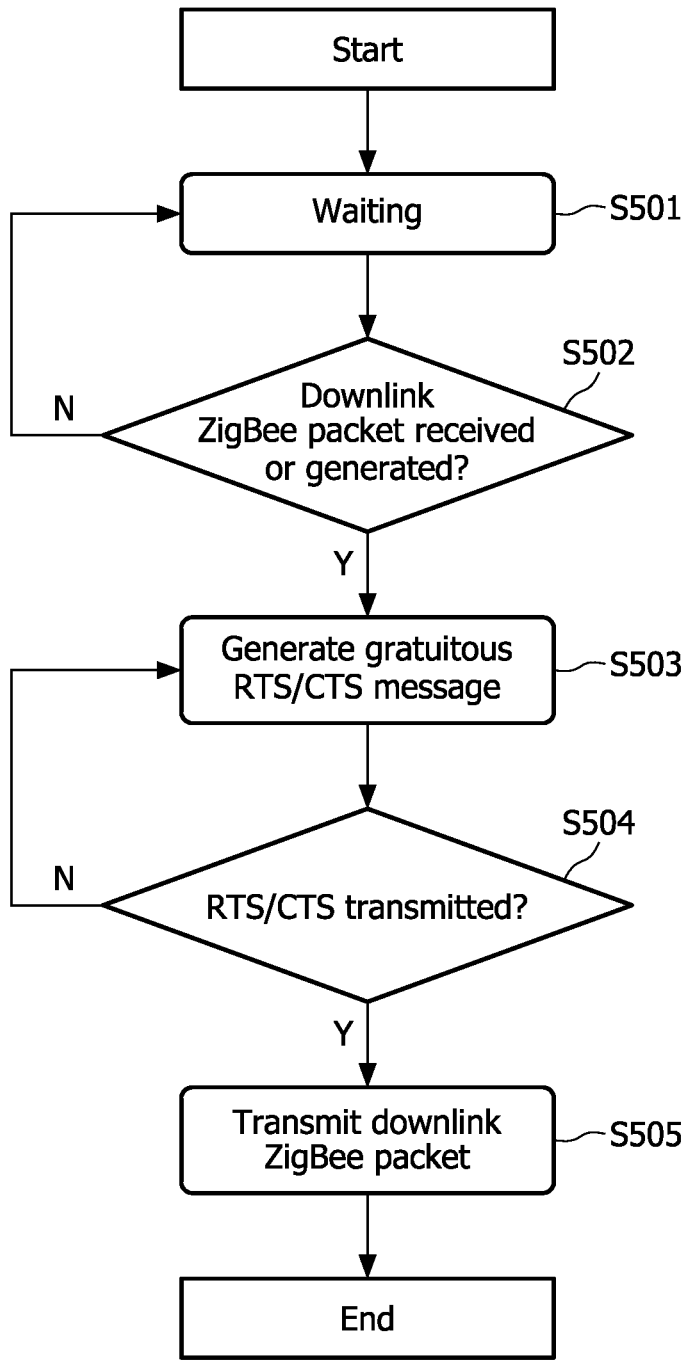
FIG. 5 is a flowchart representing a method in accordance with an aspect of the invention.

As illustrated on FIG. 5, the method in accordance with an example of the invention, begins by the detecting of any need from the Zigbee nodes 102 to transmit messages (S501 and S502). Then, the primary station sends out messages including errors on purpose, like RTS or CTS only when there is downlink traffic, at step S503. Here the RTS or CTS message is used broadly to cover all the protocol messages discussed in the various embodiments disclosed above that a sensor gateway could send to silent the media. For example, when primary station receives a packet or itself generates a packet that needs to be transmitted downlink from its ZigBee interface 1032, the primary station generates a RTS/CTS message to be transmitted first from its WLAN interface (S504). When the RTS/CTS message is transmitted successfully, the downlink packet is sent to the ZigBee interface 1032 to be transmitted at step S505. In this way, the downlink ZigBee packet will not experience interferences as the priori RTS/CTS message has disabled all surrounding interfering stations from transmissions.

Another variant of this method is that the primary station can learn from the history of past uplink transmissions and predict the pattern of uplink transmissions, such as average frequency and duration of uplink transmissions. By doing this it can learn how much time is required to reserve for the Zigbee transmissions, and in which cases. Alternatively, the primary station can be instructed explicitly with the transmission pattern of uplink transmissions. Based on the instructed or predicted transmission pattern, the primary station 103 can try to arrange transmissions of RTS/CTS messages in such a way that WLAN interfering stations would be silent for the anticipated uplink ZigBee transmissions.

Still another variant of the method is that RTS/CTS messages will be sent after a downlink message is being sent that solicits uplink messages towards the primary station. One example is a downlink broadcast message that is sent from the primary station 103 to all associated ZigBee nodes 102. The downlink message solicits each node to send back certain status information. As such, after the downlink broadcast message, it is anticipated by the sensor gateway that uplink messages will be received for certain duration. The sensor gateway could transmit RTS/CTS messages to clear the wireless media for the anticipated duration to facilitate interference-free transmissions of uplink ZigBee traffic.

This invention and its various embodiments may be implemented in networks communication systems where communication protocols are coexisting and interfering.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and the art of transmitter power control and which may be used instead of or in addition to features already described herein.

The invention claimed is:

1. A system comprising
at least one primary station and
at least one secondary station,
wherein the at least one primary station comprises
communication means for communicating with the at least one secondary station in accordance with a first protocol, wherein the communication means are arranged for communicating with a plurality of further stations in accordance with a further protocol, and wherein the primary station comprises
control means for generating a message to be broadcast to the secondary station, said message comprising purposely erroneous information, said information comprising an erroneous data length in a header field causing the at least one secondary station to remain silent for a predetermined duration.

2. The system of claim 1 wherein the further stations are arranged for communicating with one another during the predetermined duration in accordance with the further protocol.

3. The system of claim 1, wherein the message is a data packet and wherein the erroneous information comprises the length of the data packet.

4. The system of claim 1, wherein the message is a beacon indicating the beginning of a contention free period, and wherein the erroneous information comprises the length of the contention free period.

5. The system of claim 1, wherein the message is a Ready to Send message indicating that the primary station is scheduling a data transmission to a secondary station, and wherein the erroneous information comprises a non-valid secondary station address.

6. The system of claim 1, wherein the control means of the primary station are arranged to generate the message in response to arrival of data to be transmitted to at least one of the further stations.

7. The system of claim 1, wherein the further protocol is a wireless ad hoc network protocol.

8. The system of claim 1, wherein the first protocol is a wireless local area network.

9. A method for communicating in a network comprising at least one primary station and at least one secondary station, wherein the at least one primary station communicates with the secondary station in accordance with a first protocol, wherein the at least one primary station communicates with a plurality of further stations in accordance with a further protocol, and said method comprising
generating a message to be broadcast to the secondary station, said message comprising purposely erroneous information, said information comprising an erroneous data length in a header field causing the at least one secondary station to remain silent for a predetermined duration.

10. A primary station for communicating within a network comprising at least one secondary station,
wherein the primary station comprises
communication means for communicating with the at least one secondary station in accordance with a first protocol, wherein the communication means are arranged for communicating with a plurality of further stations in accordance with a further protocol, and wherein the primary station comprises
control means for generating a message to be broadcast to the at least one secondary station, said message comprising purposely erroneous information, said information comprising an erroneous data length in a header field causing the at least one secondary station to remain silent for a predetermined duration.

* * * * *